(12) United States Patent
Kanigsberg et al.

(10) Patent No.: US 10,575,039 B2
(45) Date of Patent: Feb. 25, 2020

(54) DELIVERING MEDIA CONTENT

(71) Applicant: Piksel, Inc., Wilmington, DE (US)

(72) Inventors: Issar Amit Kanigsberg, Mill Valley, CA (US); Philip Antony Shaw, London (GB); Ralf Wilhelm Tillmann, Mannheim (DE); Andrew David Gayter, Buckinghamshire (GB)

(73) Assignee: Piksel, Inc., Wilmington, DE (US)

( * ) Notice: Subject to any disclaimer, the term of this patent is extended or adjusted under 35 U.S.C. 154(b) by 43 days.

(21) Appl. No.: 14/179,723

(22) Filed: Feb. 13, 2014

(65) Prior Publication Data

US 2015/0229977 A1    Aug. 13, 2015

(51) Int. Cl.

| | |
|---|---|
| H04N 21/2668 | (2011.01) |
| H04N 21/258 | (2011.01) |
| H04N 21/234 | (2011.01) |
| H04N 21/442 | (2011.01) |
| H04N 21/8549 | (2011.01) |

(52) U.S. Cl.
CPC ... *H04N 21/2668* (2013.01); *H04N 21/23418* (2013.01); *H04N 21/25891* (2013.01); *H04N 21/44222* (2013.01); *H04N 21/8549* (2013.01)

(58) Field of Classification Search
CPC .................................................. H04N 21/2668
USPC ....................................................... 707/738
See application file for complete search history.

(56) References Cited

U.S. PATENT DOCUMENTS

| | | |
|---|---|---|
| 2003/0063407 A1 | 4/2003 | Zimmerman et al. |
| 2003/0093790 A1 | 5/2003 | Logan et al. |
| 2003/0224759 A1* | 12/2003 | Burnett .................. H04H 60/65 |
| | | 455/412.1 |
| 2009/0299843 A1* | 12/2009 | Shkedi ........................ 705/14.25 |
| 2010/0042387 A1* | 2/2010 | Gibbon .................. G06Q 30/02 |
| | | 703/6 |

(Continued)

FOREIGN PATENT DOCUMENTS

EP    1 705 908 A2    9/2006

OTHER PUBLICATIONS

International Search Report and Written Opinion for International Application No. PCT/EP2015/053164, dated Mar. 19, 2015 and consisting of 12 pages.

*Primary Examiner* — Syling Yen
(74) *Attorney, Agent, or Firm* — Hamilton, Brook, Smith & Reynolds, P.C.

(57) ABSTRACT

A content delivery system delivers media content to a content consuming user and comprises computer storage storing a media asset; an analysis component configured to perform an analysis of the user's behavior at a user device to infer a desirable attribute of a modified version of the media asset, the user's behavior comprising the user instigating at the user device requests for content other than the media asset to a computer network, and consuming the requested other content when returned from the network. The requests do not explicitly identify the desirable attribute. The system comprises a modified version generation component configured to receive the media asset and modify the media asset based on the analysis of the user's behavior; and a content delivery component configured to supply the modified version of the media asset to a media output device of the user, the modified version exhibiting the desirable attribute.

31 Claims, 7 Drawing Sheets

(56) References Cited

U.S. PATENT DOCUMENTS

| | | | |
|---|---|---|---|
| 2010/0077435 A1* | 3/2010 | Kandekar | G11B 27/005 725/61 |
| 2013/0325972 A1 | 12/2013 | Boston et al. | |
| 2014/0007154 A1* | 1/2014 | Seibold et al. | 725/25 |
| 2014/0068661 A1* | 3/2014 | Gates, III | H04N 21/458 725/34 |
| 2014/0245334 A1* | 8/2014 | Belyaev | H04N 21/44222 725/9 |
| 2015/0039678 A1* | 2/2015 | Bilinski | G06F 17/30017 709/203 |
| 2015/0169624 A1* | 6/2015 | Gupta | G06F 17/3089 707/639 |

* cited by examiner

DELIVERING MEDIA CONTENT

BACKGROUND

An ever-increasing quantity of media content is being produced that can be viewed by a content consuming user (content consumer) on a viewing device, such as a television ("TV") or similar. Moreover, a wide range of mechanisms are now available for delivering such content in addition to 'traditional' delivery mechanisms such as delivery via a broadcast channel to a television. These include on-demand delivery to computer devices such as smart-TVs, set-top boxes, smartphone or tablet devices, desktop computers, laptop computers etc. whereby a content consumer can stream media content (for online consumption) or download media content (for offline consumption) from a server over a network, such as the Internet or a cable TV network, at a time of their choosing. This includes recently broadcast content provided by a broadcaster of that content as part of a catch-up service, and historic or original (i.e. non-broadcast) content provided by a service provider as part of other on-demand services. On-demand services are accessed by a user using a user device on which is executed suitable software on such as a web-browser, media streaming or download application (or "app") e.g. provided by the broadcaster or service provider, or embedded software e.g. embedded in a set-top box provided by an operator of a cable TV network.

The proliferation not only of media content but also of the delivery mechanisms by which a user can opt to consume that content mean that, at any given time, there will likely be more media content available to a user which is at least of some interest to them than they can realistically hope to consume.

SUMMARY

The inventors have appreciated that, whilst a user might have some interest in certain media content, they may be unable or unwilling to consume that content in its original form. The inventors have further recognized that it is possible to modify that content in a way that is desirable to the user without the user having to explicitly identify how they wish the content to be modified; rather, this is inferred based on an active monitoring and analysis of the user's behavior in relation to other content.

According to a first aspect, the present disclosure considers a content delivery system for delivering media content to a content consuming user comprising computer storage configured to store a media asset; an analysis component configured to perform an analysis of the user's behavior at a user device to infer a desirable attribute of a modified version of the media asset, the user's behavior comprising the user instigating at the user device requests for content other than the media asset to a computer network, and consuming the requested other content when returned from the network, wherein said requests do not explicitly identify the desirable attribute; a modified version generation component configured to receive the media asset and modify the media asset based on the analysis of the user's behavior; and a content delivery component configured to supply the modified version of the media asset to a media output device of the user, the modified version exhibiting the desirable attribute.

The computer storage may be configured to store a plurality of media assets; the system may comprise a selection component configured to select said media asset from the plurality of media assets based on the analysis of the user's behavior; and the modified version generation component may be configured to receive the selected media asset and modify the selected media asset based on the analysis of the user's behavior.

Said requests instigated by the user may not explicitly identify the media asset, and the analysis of the user's behavior may also be to infer that the media asset is relevant to the user, the media asset being selected based on that inference. Said requests may comprise and/or said requested content may comprises an asset identifier explicitly identifying the media asset, and the media asset is selected based on the asset identifier. The asset identifier may be a hyperlink to the media asset.

The content delivery system may comprise a collection component configured to collect metadata relating to one or more of the stored assets from multiple metadata sources and to supply the collected metadata to the analysis component for use in said analysis, the collected metadata including information about the user's behavior and received by the collection component from a computer network.

The metadata may comprise an identifier explicitly identifying the media asset, and the selection component is configured to select the media asset based on the asset identifier. Alternatively, the collected metadata may not explicitly identify the media asset, and the analysis component may be configured to perform an analysis of the metadata to infer that the media asset is relevant to the user, the media asset being selected based on that inference.

Said requests may be instigated to a search engine via the network, and the requested content may comprise search results generated by the search engine responsive to receiving said requests.

Said modification of the media asset by the modified version generator may comprise editing the media asset based on the analysis of the user's behavior to reduce the duration of the media asset, the modified version being an edited version of the media asset. The edited version of the media asset may comprise one or more portions of the media asset identified as more interesting by the analysis and omits one or more portions of the media asset identified as less interesting by the analysis.

The returned other content may comprise text content and/or video content and/or image content and/or audio content.

The analysis may comprise analyzing the user's interactions with the requested other content returned to the user device to determine that some of that content is more interesting to the user than the rest of that content, the desirable attribute being inferred based on that determination.

The user's behavior may be analyzed to infer a topic of interest to the user, and modifying the media asset may comprise extracting a portion of the media asset relating to that topic for delivery to the user.

The media asset may be a video media asset. The output device of the current content consuming user may be a display screen.

The content delivery component may be a network interface configured to supply the modified version of the media asset to the media output device of the current content consuming user via a computer network. The modified version may be supplied as a stream or download via the network.

The modified version generation component may be configured to generate, based on the control information and the analysis of the user's behavior, media asset modification data and the modified version of the media asset may be generated dynamically, based on the generated modification data, as it is supplied to the media output device of the current content consuming user. The modified version of the media asset may generated dynamically responsive to one or more received modification requests, said requests having been instigated based on the generated modification data. Said requests may be instigated manually by the user. Alternatively, said requests may be instigated automatically in response to (that is, upon) reaching a point in the media asset identified as less interesting to the user by the analysis to skip to a point identified as more interesting to the user by the analysis.

According to a second aspect, a content delivery method for delivering a modified version of a media asset to a content consuming user comprises: performing an analysis of the user's behavior at a user device to infer a desirable attribute of the modified version of the media asset, the user's behavior comprising the user instigating at the user device requests for content other than the media asset to a computer network, and consuming the requested other content when returned from the network, wherein said requests do not explicitly identify the desirable attribute; receiving the media asset; modifying the received media asset based on the analysis of the user's behavior; and supplying the modified version of the media asset to a media output device of the user, the modified version exhibiting the desirable attribute.

According to a third aspect, at least one computer-readable medium stores program code which, when executed, is configured to implement a content delivery method for delivering a modified version of a media asset to a content consuming user, the method comprising: performing an analysis of the user's behavior at a user device to infer a desirable attribute of the modified version of the media asset, the user's behavior comprising the user instigating at the user device requests for content other than the media asset to a computer network, and consuming the requested other content when returned from the network, wherein said requests do not explicitly identify the desirable attribute; receiving the media asset; modifying the received media asset based on the analysis of the user's behavior; and supplying the modified version of the media asset to a media output device of the user, the modified version exhibiting the desirable attribute.

According to a fourth aspect, a computer device for delivering media content to a content consuming user comprises an access component for accessing computer storage storing a media asset; an analysis component configured to perform an analysis of the user's behavior at a user device to infer a desirable attribute of a modified version of the media asset, the user's behavior comprising the user instigating at the user device requests for content other than the media asset to a computer network, and consuming the requested other content when returned from the network, wherein said requests do not explicitly identify the desirable attribute; a modified version generation component configured to receive the media asset and modify the media asset based on the analysis of the user's behavior; and a content delivery component configured to supply the modified version of the media asset to a media output device of the user, the modified version exhibiting the desirable attribute.

The computer device may be a server or a user device.

Also disclosed is a content delivery system for delivering media content to a content consuming user, the system comprising: computer storage configured to store a media asset; an analysis component configured to perform an analysis of the user's behavior at a user device, the user's behavior comprising the user instigating at the user device requests for content other than the media asset to a computer network, and consuming the requested other content when returned from the network; an identification component configured to infer from the analysis that at least one portion of the media asset is more interesting to the user than at least another portion of the media asset, wherein said requests do not explicitly identify the portions as more or less interesting to the user; an extraction component configured to access the computer storage to identify the selected media asset and extract the more interesting portion of the media asset; and content delivery component configured to supply the extracted portion of the media asset to the media output device of the content consuming user.

The more interesting portion may be extracted responsive to a skip request received during a current delivery of the media asset to the media output device by the content delivery component, responsive to which the content delivery component is configured to skip the current delivery to the more interesting portion of the media asset by supplying the extracted portion of the media asset to the media output device. The skip request may be instigated manually by the user. The skip request may be instigated automatically in response to the current delivery reaching the less interesting other portion of the media asset.

Also disclosed is a content delivery method for delivering media content to a content consuming user, the method comprising: receiving a media asset; performing an analysis of the user's behavior at a user device, the user's behavior comprising the user instigating at the user device requests for content other than the media asset to a computer network, and consuming the requested other content when returned from the network; inferring from the analysis that at least one portion of the media asset is more interesting to the user than at least another portion of the media asset, wherein said requests do not explicitly identify the portions as more or less interesting to the user; extracting the more interesting portion of the received media asset; and supplying the extracted portion of the media asset to the media output device of the content consuming user.

Also disclosed is at least one computer-readable medium storing executable program code configured, when executed, to implement a content delivery method for delivering media content to a content consuming user, the method comprising: receiving a media asset; performing an analysis of the user's behavior at a user device, the user's behavior comprising the user instigating at the user device requests for content other than the media asset to a computer network, and consuming the requested other content when returned from the network; inferring from the analysis that at least one portion of the media asset is more interesting to the user than at least another portion of the media asset, wherein said requests do not explicitly identify the portions as more or less interesting to the user; extracting the more interesting portion of the received media asset; and supplying the extracted portion of the media asset to the media output device of the content consuming user.

Also disclosed is a computer device for delivering media content to a content consuming user, the system comprising: an access component for accessing computer storage configured to store a media asset; an analysis component configured to perform an analysis of the user's behavior at a user device, the user's behavior comprising the user instigating at the user device requests for content other than the media asset to a computer network, and consuming the requested other content when returned from the network; an identification component configured to infer from the analysis that at least one portion of the media asset is more interesting to the user than at least another portion of the media asset, wherein said requests do not explicitly identify the portions as more or less interesting to the user; an extraction component configured to access the computer storage to identify the selected media asset and extract the more interesting portion of the media asset; and a content delivery component configured to supply the extracted portion of the media asset to the media output device of the content consuming user.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

For a better understanding of the present invention and to show how the same may be carried into effect, reference will now be made by way of example only to the following drawings in which.

DETAILED DESCRIPTION

A description of example embodiments of the invention follows.

The teachings of all patents, published applications and references cited herein are incorporated by reference in their entirety.

Figure 1:
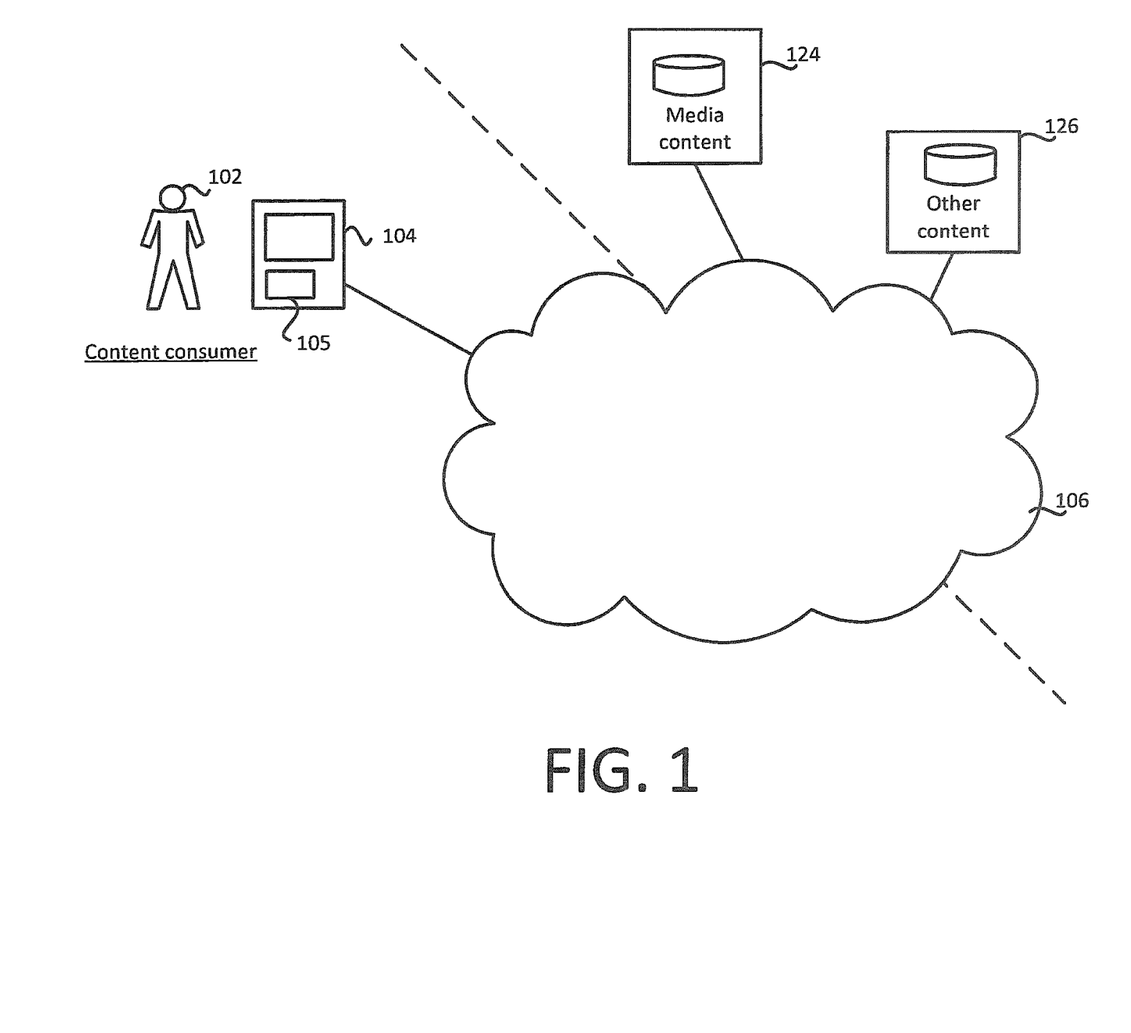
FIG. 1 is a schematic block diagram of various devices for use in delivering modified content to a user, and their associated users where applicable.

FIG. 1 shows a content consuming user 102 (current content consumer) operating a user device 104 capable of connecting to a computer network 106. The user device is a computer device in the form of, for example, a smartphone device, tablet computing device, personal computer ("PC"), smart-TV, set-top box, games console etc. The computer network is a packet-based network such as the Internet in this embodiment but may not be packet-based in other embodiments. The network connection can be wired such as Ethernet or wireless (either WiFi or GSM), or any suitable interface which allows the user device 102 to communicate with the network 106. Connected to the network 106 is a media content providing server (media server) 124 which stores media content and associated data, and another content providing server (other server) 124 which stores content other than the media content (such as web-page content e.g. HTML content). The media content is stored in the form of a collection of media assets (that is, individual pieces of media content), each media asset being, for example, an episode of a television show, a movie, a recording of a sports event (e.g. football match), a news broadcast/newsreel etc. Although shown as single servers, it will be appreciated that the functionality of each of these servers could be implemented by multiple respective servers.

The user device 104 executes a client application 105, such as a web-browser, which enables the user device 104 to communicate with both the content providing server 124 and the other content providing server 126 via the network 106. Media content stored at the server 124 can be supplied to the user device 104 via the network 106 for delivery to by the content consumer 102 e.g. as a stream or download. Other content can be supplied from the other content providing server 126 and displayed e.g. as a web-page by the application 105.

Figure 3:
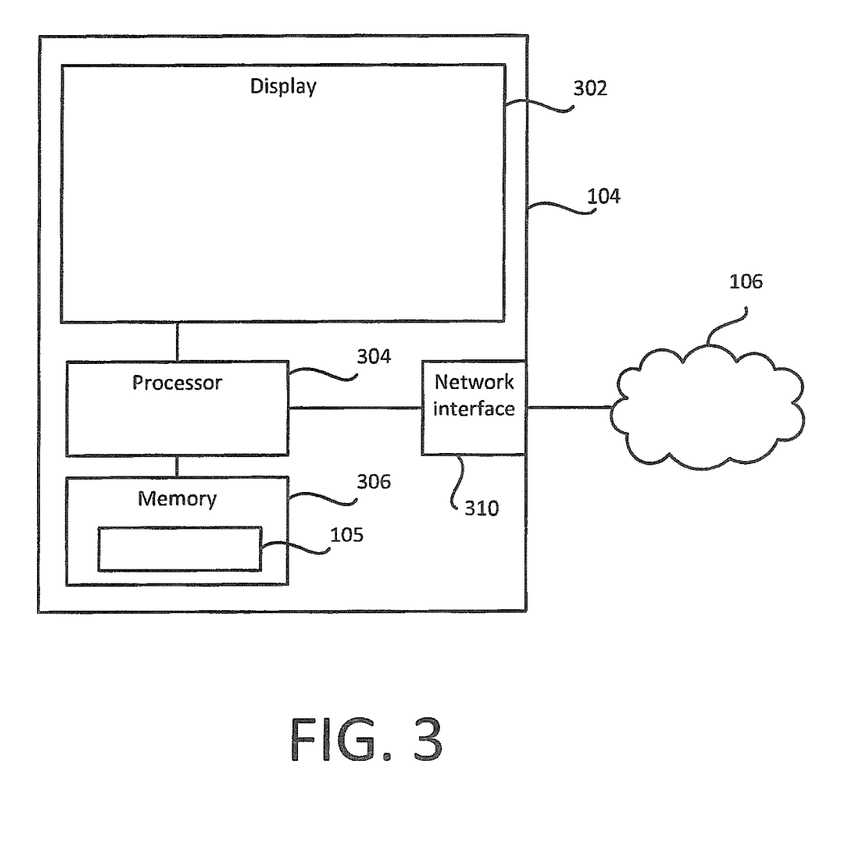
FIG. 3 is a schematic block diagram of a user device.

Further details of the user device 124 are shown in FIG. 3 which is a schematic block diagram of the user device 124. As shown in FIG. 3, the user device 104 comprises a network interface 310 for connecting to the network 106, a processor 304 in the form of one or more Central Processing Units ("CPUs"), a memory (computer storage) 306, and a media output device in the form of a screen 302. The memory 306 is connected to the processor 304 and stores software in the form of program code for execution on the processor 304 which includes operating system code for managing hardware resources of the user device 104 and applications which cause the user device 104 to perform useful tasks above and beyond the mere running of the user device itself. The applications include the client application 308. The processor 304 is connected to the screen 302 to allow the screen to display media content and other information to the user 102. The processor is connected to the network interface 310 to allow data to be transmitted to and received from the network 106, which includes the receipt of media content from the media server 124 for display on the screen 302, the transmission of requests for other content to the other server 126 and the receipt of that other content from the other server 126. The screen is a touchscreen configured to also receive inputs from the user 102 and is thus also an input device of the user device 104. In alternative user devices the screen may not be a touch screen and/or the user device may comprise alternative input devices such as a keyboard, mouse, television remote control, camera or infra-red depth sensor able to detect gesture commands, biometric sensor(s) etc. The screen, network interface and memory are integrated into the user device 104. In alternative user devices, one or more of these components may not be integrated and may be connected to the processor via a suitable external interface (e.g. cabled interface such as USB or wireless interface such as Bluetooth or other wireless interface). For instance, the screen may be an external screen connected to the processor via a SCART, RCA or other similar interface.

The client application 105 has a user interface for presenting information to the user via one or more output devices of the user device 104 and to receive information from the user via one or more input devices of the user device 104. In particular, the user interface controls the display 302 to present visual information to the user 102.

Figure 2:
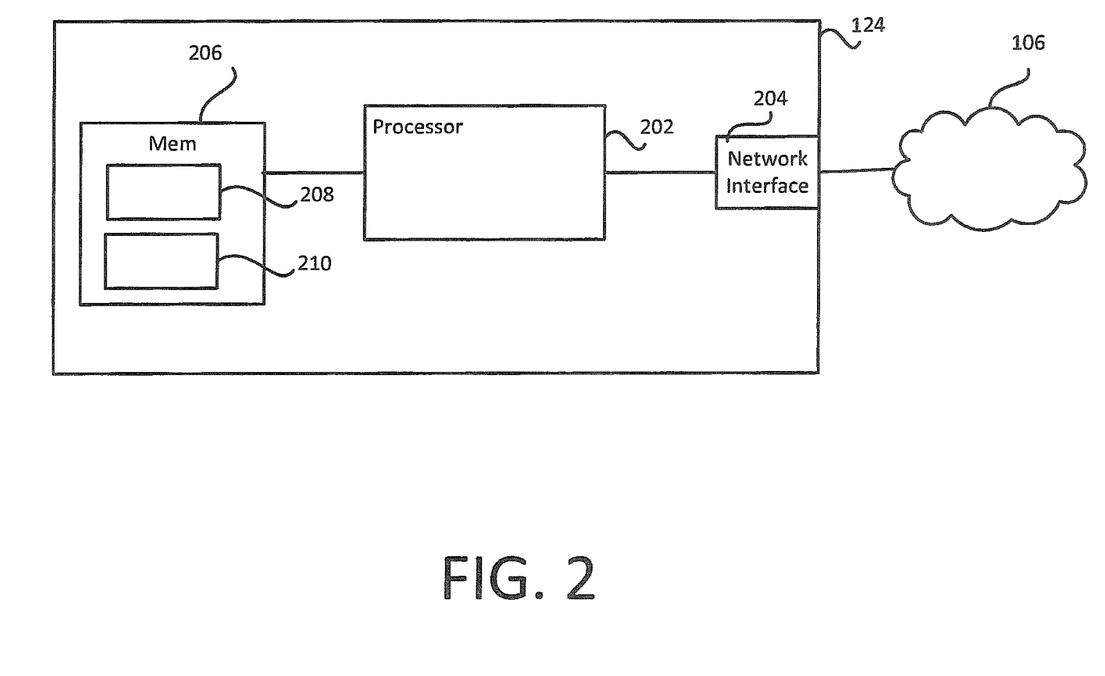
FIG. 2 is a schematic block diagram of a content providing server.

Further details of the content providing server are shown in FIG. 2 which is a block diagram of the server 124. The server 124 comprises a processor 202 in the form of one or more CPUs, a network interface 204, and computer storage 206. The computer storage 206 is connected to the processor 202 and holds both code for execution on the processor and data. The data includes a plurality of media assets 210. The code includes content provider code 208 for providing media content of those media assets to users. The processor is connected to the network interface 204 to allow data to be transmitted to and received from the network 106 by the server 124. This includes transmission of media content to the user device 104.

The other server 126 has a similar constitution to the media server 124. In this embodiment, the other server 126 is configured to execute web search engine software which enables the user 102 to search for content on the World Wide Web by instigating search requests to other server 124 at their user device 104. In response to such requests, the other server 126 returns search content to the user device 104 comprising search results directing the user 102 to other parts of the World Wide Web which pertain to their search request.

As time-based media content (e.g., video and audio files or streams) can have significant content that does not interest an individual with a given mind-set, much time can be wasted trying to get to the important parts or parts of interest of the content. Or worse, media can simply be abandoned.

Various approaches are available to provide time-based metadata including social or crowd-sourced, audio to text and image recognition (Autonomy/Blinkx, Google image search). This metadata can be used to provide various digests of time-based media based on a viewer's interests or editor's business requirements.

The disclosure considers a video platform for delivery of non-time-locked or non-time-constrained video or audio digests addressing a diverse set of viewer and corporate demands. The video platform comprises three components as set out below.

Component 1: Data Collection and Creation Services (510 in FIG. 5):
a) Metadata Systems:
collect all metadata implicit and explicit for a given video or audio asset;
static and time-code based (time-based) metadata;
creation-based (e.g., GPS, timestamp, device), editorial, speech-to-text, social, image recognition/categorization, behavioral.
b) User and Editor Data Systems:
build implicit and explicit user profiles;
collect editorial business rules;
Component 2: Data Analysis and Computation Services (508 in FIG. 5):
crunch, munge and model both metadata, user data and business rules in order to determine or predict the content elements to look for, extract and digest in the time-based audio or video media;
elements of recommendation and personalization can be used here.
Component 3: Data Informed Time-Based Media Manipulation and Delivery (506 in FIG. 5):
dynamically edit, change play rates, insert CGI, insert ads, control multiple time-synced feeds, etc.

The disclosure considers the following example applications and provides a single platform that enables them.
socially curated highlight reels and trailers (e.g., sports events);
condensed video play (e.g., for news);
ad placement;
dynamic content insertion;
multi-angle/position camera feed stitching (e.g., allowing a user to automatically or manually control how they want to view);
insertion of user generated content into video;
triggering of events external or internal to the player.

The platform will, however, produce many more opportunities and differentiable capabilities.

A personalization layer can be applied to all of these applications e.g., condensed video based on user's interests, highlight reel based on people of similar interests.

In particular, the video platform implements a process which automatically creates a particular digest of a media asset—referred to as a "summarisation engine"—wherein requests for content other than that media asset are analyzed to infer information about how the user might wish to consume that media asset in a modified form. The user does not explicitly dictate how they wish to consume that asset (that is, they do not explicitly indicate how they wish that asset to be modified)—rather, this is deduced by the summarisation engine because the user has requested other content which has some relationship with the media assert. Nor does the user necessarily explicitly select that media asset—the summarisation engine can also infer that that media asset may be of interest to the user based on the analysis of their requests.

A media asset can be edited to provide a compressed (i.e. reduced-duration and reduced-content) media asset or "summary" containing only those segments e.g. which are inferred to be interesting to a particular user.

The edited version of the media asset comprises one or more portions of the media asset identified as more interesting by the analysis and does not comprise (i.e. omits) one or more portions of the media asset identified as less interesting by the analysis.

Figure 4:
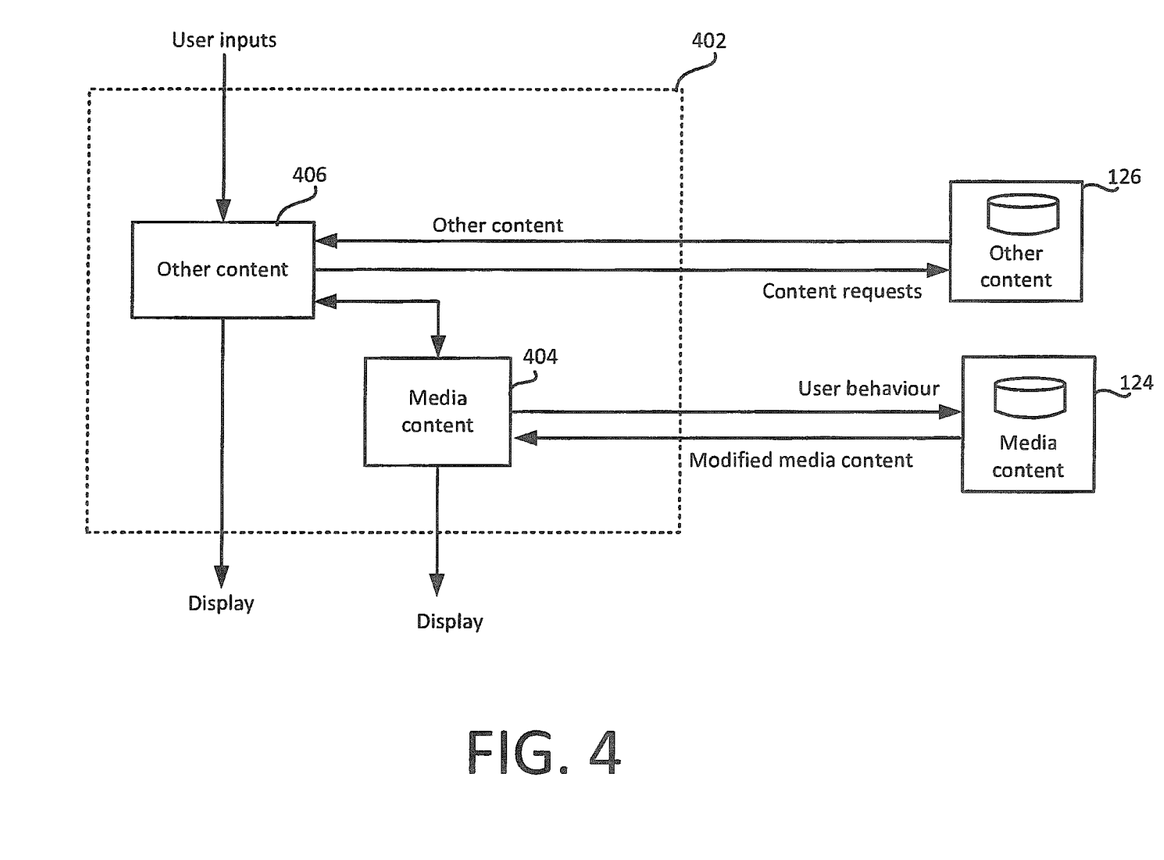
FIG. 4 is a functional block diagram of a part of a user device.

A method of delivering content to a current content consuming user will now be described with reference to FIGS. 4, 5 and 6. FIG. 4 is a functional block diagram of a part of the user device 104 and FIG. 5 is a functional block diagram of a part of the media server 124.

FIG. 4 shows a user-side content management system 402 for delivering media and other content to a content consumer. The system 402 is implemented by the user device 104 and represents the functionality implemented by executing the client application 105 on the processor 304. As shown in FIG. 4, the content delivery system 402 comprises a media content component 404 and another content component 406. The other content component 406 has a first input connected to receive user input data input by the user 102 via an input device of the user device 104. The other content component 406 has a first output connected to transmit content requests to the other content server 126 over the network 106 and a second input connected to receive requested content from the other server 126 over the network 106. The media content component has a first input connected to a second output of the other content component, a first output connected to transmit user behavior information to the media server 124 over the network 106, a second input connected to receive media content from the media server 124 over the network 106, a second output connected to supply media content and other information to one or more output devices (comprising the screen 302) of the user device 104 for delivery to the user 102, and a third output connected to a third input of the other content component 406. The other component also has a third output connected to supply information to one or more output devices (comprising the screen 302) of the user device 104 for output to the user 102.

The media component interacts with the other content component in order to monitor the user 102's behavior at the user device 104, which includes the user interacting with the other content component 406 by instigating, using one or more input devices of the user device 104, requests from the other content component 406 to the other server 126 via the network 106—those requests being requests for content stored thereat—and the user consuming the requested content, as returned by the other server 126 responsive to said requests, when delivered by the other content component to one or more output devices (comprising the screen 302) of the user device 104.

Figure 5:
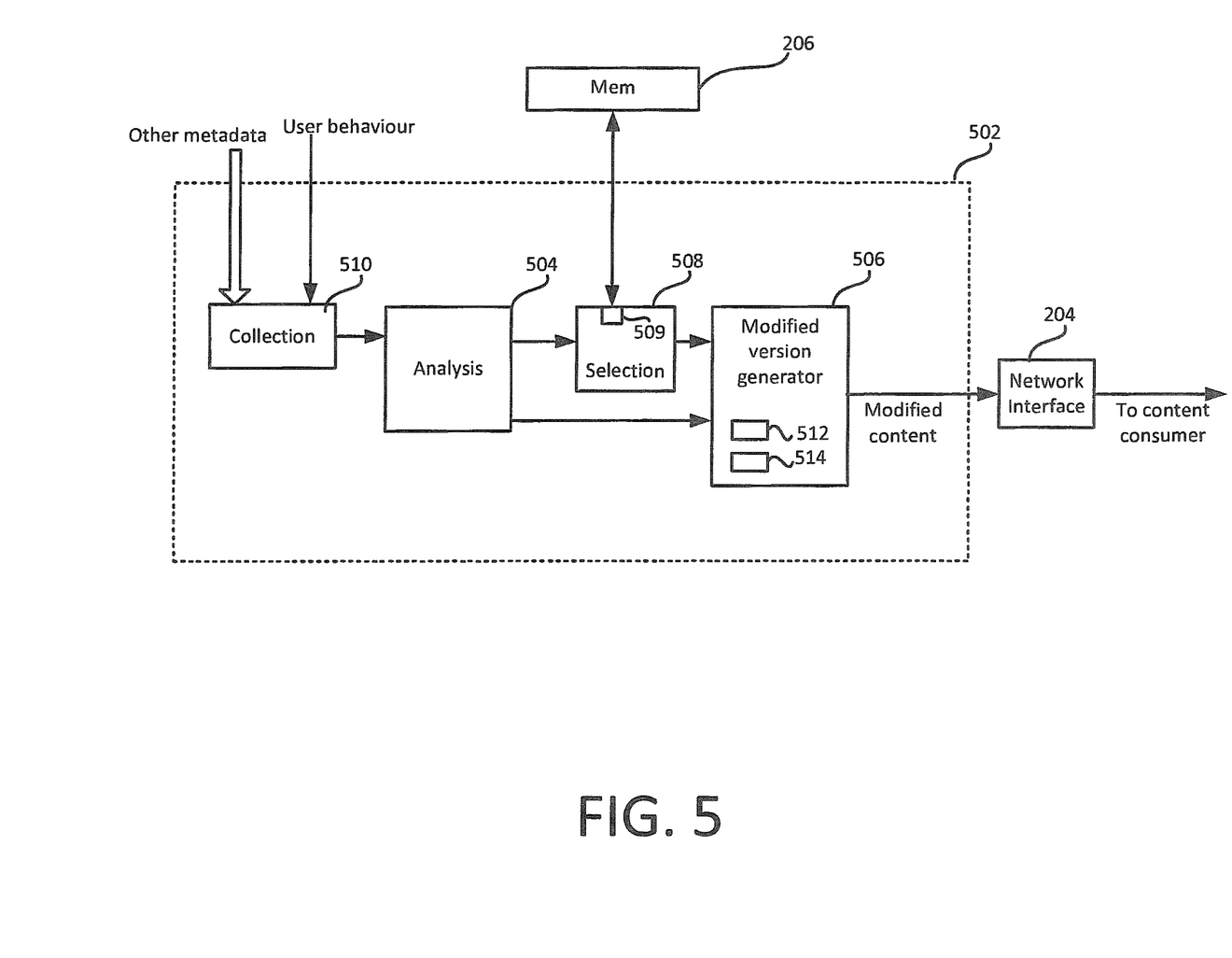
FIG. 5 is a functional block diagram of a content delivery system.
Figure 6:
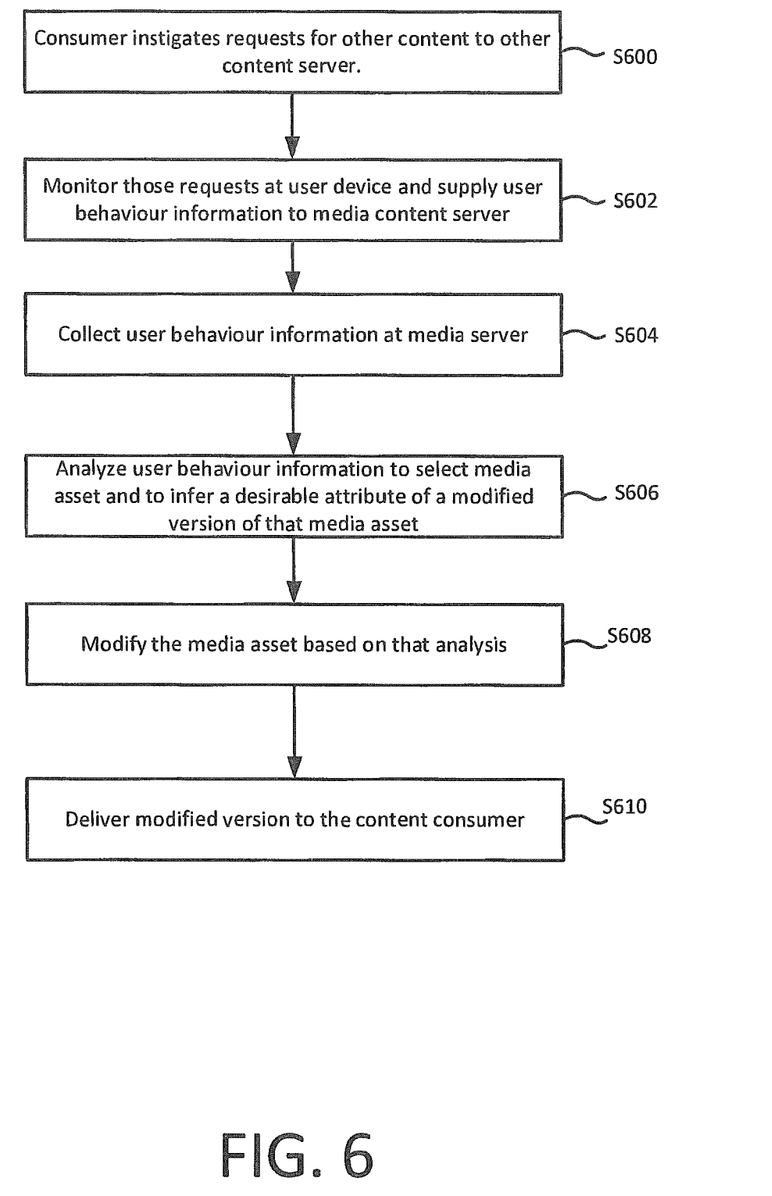
FIG. 6 is a flow chart for a content delivery method.

FIG. 5 shows a server-side media content management system 502 for delivering media content to a content consumer, which constitutes the video platform in this embodiment. The system 502 is implemented at the media server 124 and represents the functionality implemented by executing the content provider code 208 on the processor 202. The system 502 comprises a collection component 510, an analysis component 504, a modified version generation component 506 and a selection component 508. The collection component 510 has an input connected to receive the user behavior information (one form of time-based metadata) from the media content component 404 of the user-side system 402 over the network 106, and an output connected to an input of the analysis component 504. The collection component 510 also has one or more other inputs for receiving other metadata (both explicit and implicit) that may be of relevance (that is, relate to) one or more media assets stored at the media server 124.

The analysis component 504 has a first output connected to a first input of the modified version generation component 506, and a second output connected to an input of the selection component 508. The selection component 508 has an output connected to a second input of the modified version generation component 506. The selection component comprises an access component 509 for accessing the computer storage 206 to select a media asset from the plurality of media assets stored therein. The modified version generation component 506 has an output connected to supply modified media content to the network interface 204 of the server 124 for transmission to the user device 104 over the network 106 for delivery to the user 102, the modified contend being a modified version of the media asset selected by the selection component 508.

The media asset modification component comprises an identification component 512 for identifying portions of the media asset based on an analysis of the user's behavior, and an extraction component 514 for selectively extracting one or more of those portions.

The method will now be described with reference to FIG. 6 which is a flow chart for the method.

Figure 7A:
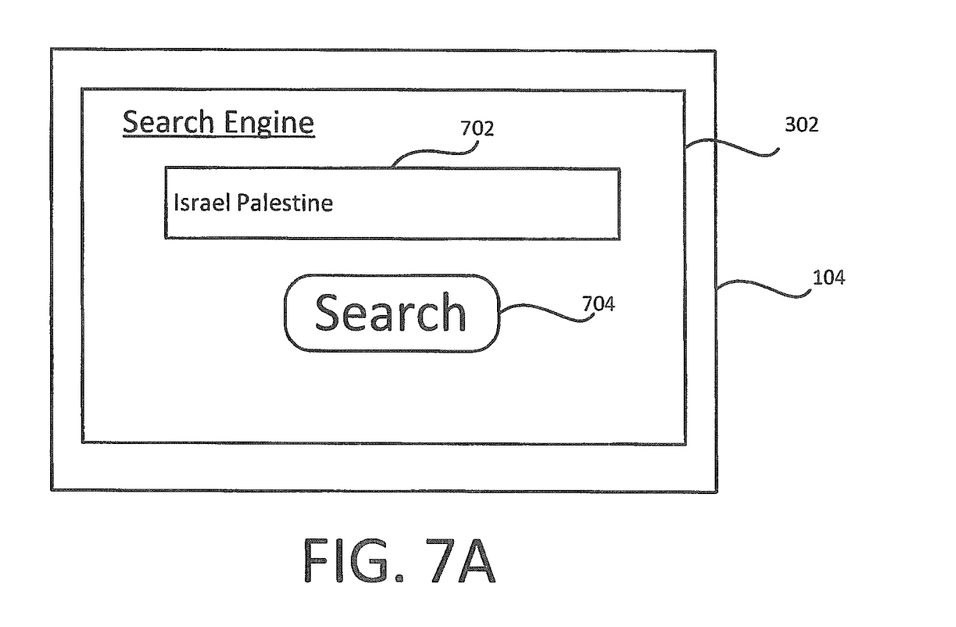
FIG. 7A is an exemplary illustration of an application user interface operating in a search mode.
Figure 7B:
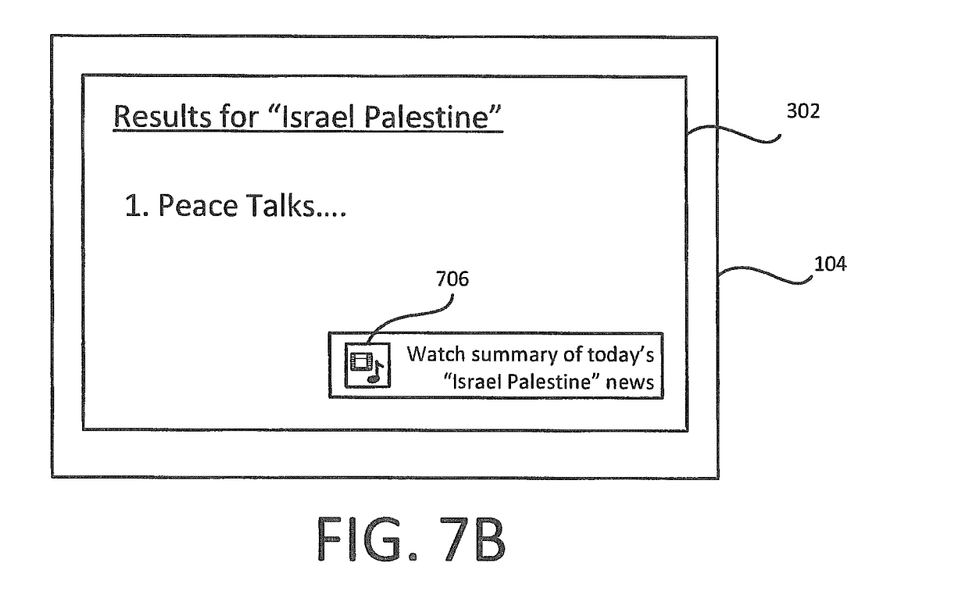
FIG. 7B is an exemplary illustration of an application user interface operation in a search results mode.

At step S600 the content consumer 102 instigates one or more requests to the other server 126 for other content stored thereat. The requests comprise search requests to be processed at the search engine implemented at the other server 126. The client application 105 operates the user interface in a search mode—an example of which is illustrated in FIG. 7A—to display via the screen 302 of the user device 104 a search field 702 and a selectable search option 704. The user 182 enters search terms into the search field 702 and responsive to selection of the search option 704, the other content component 406 transmits the input search terms to the other server 126 as the one more requests via network 106. In response, the other server 126 returns, to the user device, website content including search results obtained from the search requests by the search engine, that being the requested other content in this instance. The returned search results are displayed in a search results mode of the user interface, an example of which is illustrated in FIG. 7B.

At step S602 the media component 404 monitors the user 102's behavior at the user device and transmits to the media server 124 user behavior information comprising information about that behavior. The monitored user behavior comprises the user instigating requests to the other server 126 and consuming the returned other content as described above.

At step S604 the user behavior information is received by the collection component 510 of the media server 124 (via the network 106). The received information is a form of implicit time-based metadata which is collected by the collection component 510 along with other time-based metadata, both explicit and implicit (see above). That is, time varying metadata which does not identify any of the media assets stored at the server 124 explicitly but which nonetheless implicitly relates to one or more of the stored media assets (that implicit relationship being inferred by an analysis performed by the analysis component—see below). The collected metadata is supplied by the collection component to the analysis component 502 for analysis thereby (S606).

The user behavior is analyzed at S606 in order to 1) identify one more stored media assets that are indicated by the collected metadata to be of relevance to the user 102 (that is, identify one more stored assets to which the collected metadata, at least implicitly, relates). Explicit metadata may explicitly identify one or more media assets that are relevant to the user e.g. by way of a media asset identifier. Implicit metadata (including the user behavior information) does not explicitly indicate that any of the stored content is relevant to the user 102—rather, this is implicitly indicated by that metadata and the analysis infers that one or more stored media assets are relevant to the user 102 by way of the analysis. An example is discussed below. Once identified, a relevant media asset is then selected by the selection component 508 for delivery to the user 102 albeit in a modified form (see below).

The user behavior is further analyzed at S606 in order to 2) generate information that can be user (by the modified version generation component 506) to infer a desirable attribute of a modified version of the selected media asset; that is an attribute of the modified version that is not explicitly identified in the one or more requests instigated to the other server 126 by the user 104 but which can nonetheless be inferred from the user's behavior e.g. by analyzing information about what other content the user is requesting from the other server 126 and/or how the user 102 interacts with that content when returned by the other server 126.

The analysis involves analyzing the instigated requests themselves and/or the requested content itself e.g. to determine a topic to which the requested content relates. This can be determined e.g. by identifying keywords relating to that topic in the other content. Where the other content comprises audio content, a speech-to-text recognition procedure can be used to convert the audio to text and the keywords identified in that text. Where the other content comprise video or static image content, image recognition can be used to convert the video or image to text and the keywords identified in that text. Where the other content comprises text content, the key words can be identified in that text directly.

In embodiments, a stored media asset relates to a particular topic, or different temporal portions of a media asset relate to different respective topics (e.g. the first 5 minutes of a media asset may relate to one topic and the next 5 minutes may relate to a different topic). The topic(s) to which (portions of) a media asset relates are stored at the server 124 in association with the media assets.

The topic determined from the analysis can then be used to find 1) media assets matching that topic and 2) individual portion(s) matching that topic. The media asset is then edited to include only portion(s) relating to the identified topic without the user ever having to specify that they wish the media asset to be edited in this way.

For instance, the analysis may reveal that the user 102 has instigated a search for content relevant to a particular desirable topic e.g. a major news event that was reported on a particular day. In that event, the monitoring component might select a news-related media asset for that day e.g. a news broadcast media asset that was broadcast that same day, or some other newsreel media asset relating to that day's news. The news broadcast/newsreel might contain news items about that particular news event but also other (possibly many) items about other news events (which it is assumed are not of interest to the user at present). In this case, the summarisation engine infers from information about the search request not only that 1) the user might be interested in the news media asset (that is, that the news media asset is relevant to the user 102), but also 2) that an edited version of the news asset is most appropriate for the user, edited to include the item about the particular news event whilst omitting the other items. The summarization engine thus automatically edits the news media asset accordingly and delivers the edited version to the user over the network 106 either automatically or, as in this embodiment, at the behest of the user 102 (see below). Here, the inferred desirable topic is a time constraint/topic constraint—i.e. it is inferred that it would be desirable to the user to reduce the duration of the media asset to include only material relevant to that user (i.e. relating to a particular news topic). In this case, the desirable attribute is an implicit timing constraint/implicit topic constraint.

The analysis could also take account of how the user interacts with the other content as returned by the server. For instance, where the other content contains search results generated by the search engine comprising one or more hyperlinks to other websites, the user can interact with (i.e. navigate) those results by selecting one or more of those links to request further webpage content, both text-based and/or video-based content, from another server (not shown) of the network 106. Information about this interaction (i.e. about how the user navigates the search results) can be supplied to the analysis component 504, and thus influence both a selection of media content and/or modification of the selected media content. For instance, it can be inferred that only those links which the user selects are of interest to the user, and that links which the user ignores are not of interest to the user.

The requests for other content instigated by the user at S600 do not explicitly identify the desirable attribute of the modified version of the asset, and they may or may not explicitly identify the to-be-modified media asset itself. Further, the requested other content returned by the other server 126 does not explicitly identify the desirable attribute, and may or may not explicitly identify the asset itself (e.g. a link to the media asset may be included in the search results generated by the search engine which explicitly identifies the media asset, or such a link may not be included in the search results but the search results may nonetheless contain a link to, say, a text-based news story relating to the same news event as a news broadcast media asset stored at the server 124—that link does not explicitly identify the news broadcast media asset but it can be inferred from that link that the news broadcast media asset is relevant to the user 120 as they relate to the same news event).

At step S608 the modified version generator 506 modifies the media asset based on the analysis by the analysis component 504 to generate a modified version of media asset exhibiting the inherent desirable attribute e.g. editing the news broadcast media asset to include only item(s) pertaining to the desirable topic.

At step S610 the modified version of the media asset is supplied to the network interface 204 for transmission over the network 106 to the user device 104. In this embodiment, the server 124 firsts sends a notification of the availability of the modified content to the user device 104, responsive to which media component 404 displays via the user interface a selectable modified content option 706. The options 706 is displayed in the search results mode in conjunction with the search results received from the other server 126 in this embodiment. Responsive to selection of the option 706 by the user 102, the media component 404 instigates a request for the modified media asset to the media server 124 over the network 106, responsive to which the modified version generator 506 supplies the modified version of the media asset to the user device 104 as a stream in this embodiment. In alternative embodiments, the modified version may be supplied as a download.

The media component 404 delivers the modified version of the media asset to the user 182 via user interface as the stream is received (or alternatively once the download has completed).

Note that references to "modifying an asset", to "generating a modified asset" and the like do not necessarily imply that media data separate from the media data of the original asset is generated and e.g. stored in memory alongside the original media asset.

A modified version of a media asset can be created by generating media asset modification (meta)data in the form of a "skip track" which identifies, for instance, those portions of the media asset which should be skipped when the modified version thereof is delivered—e.g. to generate the summary containing a portion relating to a particular topic, the modification can be effected by generating metadata which specifies that delivery of the selected content as a stream to the user 102 via the network 106 should commence at that portion and terminate at the end of that portion. Where there are multiple, non-contiguous portions of a media asset inferred as relevant to the user, the skip track may dictate that delivery commence at the start of the earliest portion of interest, skip to the start of the next portion of interest upon reaching the end of that portion of interest etc. until reaching the end of the final portion of interest at which point the skip track dictates that delivery be terminated. That is, the modified version of the media asset may be generated 'on-the-fly' as the media asset is, say, streamed to the content consumer over the network 106 by skipping the delivery to include only those portions inferred to be relevant to the user.

This is advantageous in many scenarios as it requires only minimal memory overhead to generate each modified version of the selected content (whereas significant memory overheads would be required to generate and store possibly numerous partial replicas of the original media content).

In embodiments, the skip track is transmitted to the user device 104 over the network 106 for use thereat. For instance, responsive to a download input from the current consumer, the application at the user device may download both the full, unmodified media asset and the skip track from the media server 124, and the downloaded media asset may then be delivered at the user device in dependence on the skip track in the manner described above e.g. to only deliver portions of the media asset inferred as relevant to the user, as identified by the skip track. For instance, the modified version may be generated and stored at the user device based on the unmodified version and the skip track as a separate media file, or the downloaded media asset may be modified 'on-the-fly' (dynamically) as the downloaded media asset is delivered (played-out) in order to deliver the modified version to the consumer at the user device. That is, the application running on the user device may modify a media asset stored at the user device based on the analysis of the user's behaviors (e.g. using the skip track stored at the user device).

As another example, the media asset may be streamed to the user device and the application 105 on the user device (or possibly a plugin to that application) may automatically instigate one or more media asset modification requests in the form of skip requests to the server 124 over the network 106 based on the received skip track, responsive to which the media asset stream skips to the next relevant portion, relative to a current elapsed time of the stream, identified by the skip track in order to modify the asset, again, 'on-the-fly'. For instance, a skip request may be instigated automatically responsive to the application (or plugin) determining the stream has reached a point in the media asset which is not a moment of inferred relevance/interest (that is a temporal point outside of a temporal interval inferred to be relevant) in order to skip to the next moment of inferred relevance/interest.

Alternatively these skip requests may be instigated manually but in nonetheless in response to information and/or selectable options presented to the user via the user interface based on the received skip track. That is, the modification may be effected at the user terminal and possibly the behest of the current content consuming user thereof.

In some embodiments, the skip track is transmitted to the user device (see above) and a selectable skip option is selectively displayed during delivery of the media asset via the client user interface based on the received skip track e.g. the skip track may only be displayed if the skip track indicates that a current elapsed time of the media asset delivery is not a moment of interest (that is, which has not been inferred as interesting to the consumer), and may optionally be displayed in conjunction with a textual "overlay" on the video which informs the user that they might wish to consider skipping ahead by an amount of time (e.g. in minutes) that would take them to the next inferred moment of interest/relevance identified by the skip track relative to the current elapsed time of the delivery (or the textual overlay may be displayed as an alternative to the selectable option).

Whilst in the above, the media component 404 and the other component 306 represent functionality implemented by executing the same application, alternatively these components could represent functionality represented by executing different applications (that is, these components may be components of different applications). Alternatively, the other component may represent the functionality of a web-browser application and the media component may represent functionality gained by implementing adding a plug-in to the web-browser application.

Further, whilst in the above the functionality of server 124 is implemented by a single server, in alternative embodiments the same functionality may be implemented by more than one server. For instance, a first content server may comprise computer storage storing the media assets, and a second content server may comprise an access component for accessing the computer storage at the first server remotely in order to modify the remote media asset.

Further, whilst in the above the media asset is a video asset (comprising video data and possibly audio data), a media asset may alternatively be an audio asset (comprising audio data but not video data) e.g. an audio asset might be an episode of a radio show, or a music track etc.

Whilst in the above, the system 502 is implemented at the server 124, in alternative embodiments some or all of the system may be implemented at the user device 104. For instance, the user device may download and store an (original, unmodified) media asset, and the application on the user device may download (possibly pre-filtered) audience reaction data—or the aforementioned "skip track"—from the server 124 and modify the content based thereon (that is the application 105 running on the user device may be configured to implement some or all of the system 502 of FIG. 5 and the method of FIG. 6, although in this case the modified version is supplied to the screen of the user device directly and may not be supplied to the network 106). That is, the user device may access the audience reaction data in computer storage of the network 106 (e.g. computer storage 206) remotely via the network 106.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A content delivery system for delivering media content to a content consuming user, the system comprising:

computer storage configured to store a plurality of media assets comprising content;

a processor; and a memory with computer code instructions stored thereon, the processor and the memory, with the computer code instructions being configured to cause the content delivery system to implement:

an analysis component configured to perform an analysis of the user's behavior at a user device, the user's behavior comprising the user instigating at the user device requests for content other than the plurality of media assets to a computer network, and consuming the requested other content when returned from the network;

wherein the analysis component is further configured to perform further analysis of the user's behavior at the user device to infer a topic constraint, wherein said requests do not explicitly identify the topic constraint;

the computer code instructions being further configured to cause the content delivery system to implement:

a selection component configured to select a media asset from the plurality of media assets based on the topic constraint;

a modified version generation component configured to generate media asset modification metadata for the selected media asset based on the topic constraint, and modifying the content of the selected media asset based on the identified modification to produce a compressed selected media asset, wherein the compressed selected media asset includes portions of the selected media asset related to the topic constraint without the user having to specify that they wish the media asset to be edited in this way; and a content delivery component configured to transmit the modified selected media asset to a media output device of the user.

2. A content delivery system according to claim 1 wherein said requests instigated by the user do not explicitly identify the media asset, and the analysis of the user's behavior is also to infer that the media asset is relevant to the user, the media asset being selected based on that inference.

3. A content delivery system according to claim 1 wherein said requests comprise and/or said requested content comprises an asset identifier explicitly identifying the media asset, and the media asset is selected based on the asset identifier.

4. A content delivery system according to claim 3 wherein the asset identifier is a hyperlink to the media asset.

5. A content delivery system according to claim 1 comprising a collection component configured to collect metadata relating to one or more of the stored media assets from multiple metadata sources and to supply the collected metadata to the analysis component for use in said analysis, the collected metadata including information about the user's behavior and received by the collection component from a computer network.

6. A content delivery system according to claim 5 wherein the metadata comprises an identifier explicitly identifying the media asset, and the selection component is configured to select the media asset based on the asset identifier.

7. A content delivery system according to claim 5 wherein the collected metadata does not explicitly identify the media asset, and the analysis component is configured to perform an analysis of the metadata to infer that the media asset is relevant to the user, the media asset being selected based on that inference.

8. A content delivery system according to claim 1 wherein said requests are instigated to a search engine via the network, and the requested content comprises search results generated by the search engine responsive to receiving said requests.

9. A content delivery system according to claim 1 wherein said media asset modification metadata is a skip track, and the modification of the selected media asset by the skip track comprises reducing the duration of the selected media asset by identifying portions of the selected media asset to be skipped when the selected media asset is delivered.

10. A content delivery system according to claim 9 wherein the modified media asset comprises one or more portions of the selected media asset identified as more interesting by the analysis and omits one or more portions of the selected media asset identified as less interesting by the analysis.

11. A content delivery system according to claim 1 wherein the returned other content comprises text content and/or video content and/or image content and/or audio content.

12. A content delivery system according to claim 1 wherein the analysis comprises analyzing the user's interactions with the requested other content returned to the user device to determine that some of that content is more interesting to the user than the rest of that content, the topic constraint being inferred based on that determination.

13. A content delivery system according to claim 1 wherein the media asset is a video media asset.

14. A content delivery system according to claim 1 wherein the output device of the current content consuming user is a display screen.

15. A content delivery system according to claim 1 wherein the content delivery component is a network interface configured to transmit the modified media asset to the media output device of the current content consuming user via a computer network.

16. A content delivery system according to claim 15, wherein the modified media asset is transmitted as a stream or download via the network.

17. A content delivery system according claim 1 wherein the modified version generation component is configured to generate, based on the control information and the analysis of the user's behavior, media asset modification metadata and the modified media asset is generated dynamically, based on the generated modification metadata, as it is transmitted to the media output device of the current content consuming user.

18. A content delivery system according to claim 17 wherein the modified media asset is generated dynamically responsive to one or more received modification requests, said requests having been instigated based on the generated modification metadata.

19. A content delivery system according to claim 18 wherein said requests are instigated manually by the user.

20. A content delivery system according to claim 18 wherein said requests are instigated automatically in response to reaching a point in the selected media asset identified as less interesting to the user by the analysis to skip to a point identified as more interesting to the user by the analysis.

21. A content delivery system according to claim 1 wherein the analysis component is further configured to perform an analysis of the user's behavior at a user device, the user's behavior comprising the user instigating at the user device requests for content other than the plurality of media assets to a computer network, and consuming the requested other content when returned from the network;
the system further including:
an identification component configured to infer from the analysis that at least one portion of the selected media asset is more interesting to the user than at least another portion of the selected media asset, wherein said requests do not explicitly identify the portions as more or less interesting to the user;
an extraction component configured to access the computer storage to identify the selected media asset and extract the more interesting portion of the selected media asset; and
the content delivery component is further configured to transmit the extracted portion of the selected media asset to the media output device of the content consuming user.

22. A content delivery system according to claim 21 wherein the more interesting portion is extracted responsive to a skip request received during a current delivery of the selected media asset to the media output device by the content delivery component, responsive to which the content delivery component is configured to skip the current delivery to the more interesting portion of the selected media asset by transmitting the extracted portion of the selected media asset to the media output device.

23. A content delivery system according to claim 22 wherein the skip request is instigated manually by the user.

24. A content delivery system according to claim 22 wherein the skip request is instigated automatically in response to the current delivery reaching the less interesting other portion of the selected media asset.

25. A content delivery method for delivering a modified version of a media asset comprising content to a content consuming user, the method comprising:

performing an analysis of the user's behavior at a user device, the user's behavior comprising the user instigating at the user device requests for content other than a plurality of media assets to a computer network, and consuming the requested other content when returned from the network;

receiving the selected media asset;

performing further analysis of the user's behavior at the user device to infer a topic constraint, wherein said requests do not explicitly identify the topic constraint;

selecting a media asset from the plurality of media assets based on the topic constraint;

generating media asset modification metadata for the selected media asset based on the topic constraint;

modifying the content of the selected media asset based on the media asset modification metadata to produce a compressed selected media asset, wherein the compressed selected media asset includes portions of the selected media asset related to the desirable attribute without the user having to specify that they wish the media asset to be edited in this way; and transmitting the modified selected media asset to the user.

26. A content delivery method according to claim 25 wherein the user's behavior further includes the user instigating at the user device requests for content other than the plurality of media assets to a computer network, and consuming the requested other content when returned from the network; wherein the content delivery method further includes:

inferring from the analysis that at least one portion of the selected media asset is more interesting to the user than at least another portion of the selected media asset, wherein said requests do not explicitly identify the portions as more or less interesting to the user;

extracting the more interesting portion of the received selected media asset; and transmitting the extracted portion of the media asset to the media output device of the content consuming user.

27. At least one non-transitory computer-readable medium storing program code which, when executed, is configured to implement content delivery of a modified version of a media asset comprising content to a content consuming user by:

performing an analysis of the user's behavior at a user device, the user's behavior comprising the user instigating at the user device requests for content other than a plurality of media assets to a computer network, and consuming the requested other content when returned from the network;

receiving the selected media asset;

performing further analysis of the user's behavior at the user device to infer a topic constraint, wherein said requests do not explicitly identify the topic constraint;

selecting a media asset from the plurality of media assets based on the topic constraint;

generating media asset modification metadata for the selected media asset based on the topic constraint;

modifying the content of the selected media asset based on the media asset modification metadata to produce a compressed selected media asset, wherein the compressed selected media asset includes portions of the selected media asset related to the desirable attribute without the user having to specify that they wish the media asset to be edited in this way; and transmitting the modified selected media asset to the user.

28. At least one non-transitory computer-readable medium as in claim 27 wherein the user's behavior includes the user instigating at the user device requests for content other than the plurality of media assets to a computer network, and consuming the requested other content when returned from the network;

wherein the program code is further configured, when executed, to implement the content delivery by:

inferring from the analysis of the user's behavior at the user device that at least one portion of the selected media asset is more interesting to the user than at least another portion of the selected media asset, wherein said requests do not explicitly identify the portions as more or less interesting to the user;

extracting the more interesting portion of the received selected media asset; and transmitting the extracted portion of the selected media asset to the media output device of the content consuming user.

29. A computer device for delivering media content to a content consuming user, the computer device comprising:

a processor; and a memory with computer code instructions stored thereon, the processor and the memory, with the computer code instructions being configured to cause the computer device to implement:

an access component for accessing computer storage storing a plurality of media assets comprising content;

an analysis component configured to perform an analysis of the user's behavior at a user device, the user's behavior comprising the user instigating at the user device requests for content other than the plurality of media assets to a computer network, and consuming the requested other content when returned from the network;

wherein the analysis component is further configured to perform further analysis of the user's behavior at the user device to infer a topic constraint, wherein said requests do not explicitly identify the topic constraint;

a selection component configured to select a media asset from the plurality of media assets based on the topic constraint;

a modified version generation component configured to generate media asset modification metadata for the selected media asset based on the topic constraint, and modifying the content of the selected media asset based on the identified modification to produce a compressed selected media asset, wherein the compressed selected media asset includes portions of the selected media asset related to the topic constraint without the user having to specify that they wish the media asset to be edited in this way; and a content delivery component configured to transmit the modified selected media asset to a media output device of the user.

30. A computer device according to claim 29 wherein the computer device is a server or a user device.

31. A computer device according to claim 29 wherein the user behavior comprises the user instigating at the user device requests for content other than the plurality of media assets to a computer network, and consuming the requested other content when returned from the network;

wherein the computer device further includes:

an access component for accessing computer storage configured to store the plurality of media assets;

an identification component configured to infer from the analysis that at least one portion of the selected media asset is more interesting to the user than at least another portion of the selected media asset, wherein said requests do not explicitly identify the portions as more or less interesting to the user;

an extraction component configured to access the computer storage to identify the selected media asset and extract the more interesting portion of the selected media asset; and the content delivery component is further configured to transmit the extracted portion of the media asset to the media output device of the content consuming user.

\* \* \* \* \*